3,819,836
METHOD FOR THE PRODUCTION AND ISOLATION OF ANTIBIOTIC AV290 SULFATE
Ping Shu, Pomana, and Murray Dann, Pearl River, N.Y., assignors to American Cyanamid Company, Stamford, Conn.
No Drawing. Continuation-in-part of abandoned application Ser. No. 117,074, Feb. 19, 1971. This application May 4, 1972, Ser. No. 250,259
Int. Cl. A61k 21/00
U.S. Cl. 424—124       1 Claim

ABSTRACT OF THE DISCLOSURE

This disclosure describes a multistep process for recovering highly purified antibiotic AV290 from a fermentation whole harvest mash obtained by the cultivation under controlled conditions of *Streptomyces candidus* NRRL 3218 and mutants thereof.

CROSS REFERENCE TO RELATED APPLICATION

This application is a continuation-in-part of our copending application Ser. No. 117,074, filed Feb. 19, 1971, now abandoned.

BRIEF SUMMARY OF THE INVENTION

This invention relates to a method of recovering highly purified antibiotic AV290 from fermentation whole harvest mashes containing it. More particularly, the process involves first adding a synthetic tanning agent to the filtered fermentation liquor and recovering the so precipitated antibiotic-syntan reversible complex by any convenient means. The complex is then redissolved in water at a pH of 6.0–9.0 and this solution is passed through a bed of carboxymethyl substituted cross-linked dextran gel grains whereupon the antibiotic AV290 is selectively adsorbed onto the gel grains. The antibiotic AV290 is then removed from the gel bed by elution with dilute sulfuric acid. The eluate is neutralized with barium hydroxide and the clarified eluate is then evaporated to dryness, preferably under high vacuum, at freezing temperature to provide highly purified antibiotic AV290.

DETAILED DESCRIPTION OF THE INVENTION

Antibiotic AV290 is formed by fermentative biosynthesis during the cultivation under controlled conditions of *Streptomyces candidus* NRRL 3218 and mutants thereof. The preparation and properties of antibiotic AV290 are set forth in U.S. Pat. No. 3,338,786 which is hereby incorporated by reference. The problem of recovering the antibiotic economically in highly purified form has been a serious one. In the patent referred to above, adsorption on charcoal followed by elution and two stages of column chromatography are employed. Such a process is excessively expensive even where pure antibiotic is required for medical usage. There is, therefore, a need for an inexpensive process of recovering the antibiotic in highly purified form for this purpose.

The present invention deals with a process which involves first the precipitation of the antibiotic from the filtered fermentation broth by the addition of a synthetic tanning agent. The synthetic tanning agent operable in the novel process of the present invention is a sulfited phenol formaldehyde condensate which may be represented by the following general formula:

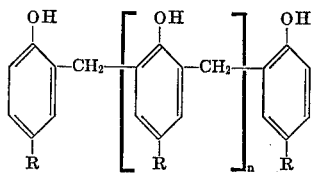

wherein R is hydrogen or a methylene sulfonic acid group ($-CH_2SO_3H$) and $n$ is 0,1,2,3, or 4 with the proviso that about half of the R groups present are methylene sulfonic acid groups. This synthetic tanning agent is not a pure chemical compound but of necessity is obtained as a mixture having an estimated molecular weight of 420–530. It is readily prepared by first condensing phenol and formaldehyde in aqueous media followed by reaction of the intermediate condensate with formaldehyde, various sulfites, and buffer acids thus forming $\omega$-sulfonic acid groups ($-CH_2SO_3H$) in the molecule. The product is an amorphous water-soluble material that may be obtained either in concentrate water solution or in powder form, and ranges from colorless to dark brown. In order to avoid cumbersome language, this synthetic tanning agent will be referred to by its generic name in the art as "syntan," and this term will be used extensively in the specification and appended claims. A sulfited phenol formaldehyde syntan of the above general type is sold by A. J. & J. O. Pilar Inc. of Newark, N.J. under the trade Tru-Tan RT Regular ®.

The novel process of the present invention provides almost complete removal of the antibiotic activity from the fermentation broth. Furthermore, the antibiotic-syntan complex so obtained can be used directly without separation of the constituents in the subsequent adsorption and elution steps, which is an important economic advantage.

The product of the antibiotic and the syntan has been referred to as reversible antibiotic-syntan complex. Its exact chemical nature has not been determined, but covalent bonding is not involved and the product is not a physical mixture. This complex, derived from the interaction of the antibiotic and the syntan, is not necessarily combined in any limiting stoichiometry. The chemical bonds are reversible since antibiotic AV290 may be recovered from the complex by adsorption on a carboxymethyl substituted cross-linked dextran gel column followed by elution with aqueous sulfuric acid. While it is not intended to limit the present invention to theories of chemical constitution and the like, it seems probable that the complex is sufficiently reversible so that under conditions of neutral or slightly alkaline pH, the antibiotic is set free.

As starting material for the novel process of the present invention there is employed the whole harvest mash obtained after completion of a fermentation with *S. candidus* NRRL 3218, or mutants thereof, which is clarified by removing the mycelia and other insolubles by filtration. Diatomaceous earth or any other conventional filtration aid may be used to assist in the filtration. The pH of the filtered broth is then adjusted to between 1.4 and 5.0 with dilute aqueous acid. Suitable acids for this purpose may be, for example, dilute hydrochloric acid, dilute sulfuric acid, dilute trifluoroacetic acid, etc., although even glacial acetic acid may be used. Then, an aqueous solution of the syntan is added slowly, with stirring, at ambient temperatures. The antibiotic and the syntan form a complex which is water-insoluble and thus precipitates. The precipitated syntan complex is then removed by filtration or centrifugation.

It is an advantage of the present invention that the amount of syntan added to precipitate the complex with antibiotic is not critical and no exact stoichiometric relations need be followed. Preferably, the amount of syntan used will be slightly in excess of the minimum required to form the complex with the antibiotic. The amount of syntan required is, however, directly proportional to the antibiotic concentration in the liquor. The specific bioactivity of the precipitated complex also varies and it is in fact likely that the complex has varying relative amounts of antibiotic and, of course, is quite likely to be a mixture of complexes because the syntan used is not a pure single chemical compound.

The minimum amount of syntan required to form the complex with the antibiotic in any particular fermentation batch may be readily determined as follows. A sample (conveniently 50–100 ml.) of the fermentation whole harvest mash is taken and clarified by removing the mycelia and other insolubles by filtration, preferably with a filter aid. The filtrate is then acidified to a pH of 1.8–2.0 with dilute aqueous mineral acid such as dilute hydrochloric acid, dilute sulfuric acid, dilute phosphoric acid, or the like. This solution is then titrated with the particular aqueous solution of syntan which is to be used until no further precipitate or turbidity forms. The amount of syntan solution for the fermentation batch is then calculated from the titer of the sample taken, providing also for a slight excess.

After isolation of the precipitated antibiotic AV290-syntan complex by filtration or centrifugation, it is redissolved by adjusting the pH value of a water suspension of the complex to pH 6.0–9.0 with dilute aqueous alkali. Suitable bases for this purpose may be, for example, dilute sodium hydroxide, dilute potassium hydroxide, aqueous ammonia, etc. This solution of complex should be made up to contain from about one to about 100 mg. of antibiotic AV290 per ml. of solution. This concentration may be readily determined by bioassay, after adjusting the pH to 8.0–9.0, as set forth in U.S. Pat. No. 3,338,786. From the potency data thus obtained, the proper dilution of the solution may be readily calculated. The use of a highly concentrated solution of complex reduces the flow rate through the column and also reduces the ion exchange capacity. The aqueous solution of complex thus prepared is then passed through a column packed with a bed of carboxymethyl substituted cross-linked dextran gel grains whereupon the complex is disassociated and the antibiotic AV290 is adsorbed onto the gel grains.

The carboxymethyl substituted cross-linked dextran gels suitable for the process of the present invention may be obtained by first reacting dextran having an average molecular weight within the range of from about 5,000 to about 100,000 with epichlorohydrin, which results in a copolymerisate consisting of a three-dimensional macroscopic network. This network is built up of chains of mainly alpha-1,6-glycosidically bonded glucose residues bound together by ether bridges of the type

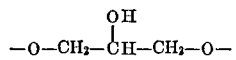

said gels having a content of hydroxyl groups of at least 15% of the weight of the dry gel and a water regain within the range of from about one to about 50 g./g. of the dry gel product. These gel products are ground down to a particle size within the range of from about 0.05 to about 0.50 mm., preferably to a particle size corresponding to 20 to 200 mesh according to U.S. standard mesh. These gel products are produced commercially for chromatographic use under the trade name of Sephadex G by Pharmacia Fine Chemicals, Inc., Uppsala, Sweden.

The essential features of Sephadex G can be visualized from the following schematic formula:

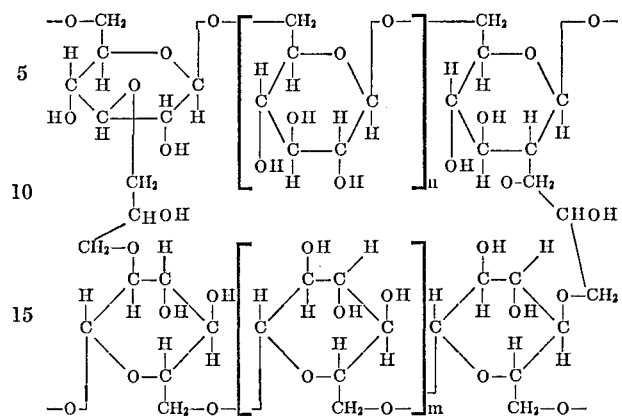

These gels are insoluble in water although capable of swelling therein and have a great stability and durability. The degree of swelling depends on the degree of crosslinkage and is characterized by the so-called water regain. This is the amount of water that is absorbed by one gram of dry gel during swelling. There are eight types of Sephadex G gels with water regain values ranging from 1 to 20 as set forth in Table I below:

TABLE I

| Type | Particle size (dry; in μ) | Water regain (g./g.) | Gel bed (ml./g.) |
|---|---|---|---|
| Sephadex G-10 | 40-120 | 1.0 | 2-3 |
| Sephadex G-15 | 40-120 | 1.5 | 2.5-3.5 |
| Sephadex G-25 | 50-150 | 2.5 | 4-6 |
| Sephadex G-50 | 50-150 | 5.0 | 9-11 |
| Sephadex G-75 | 40-120 | 7.5 | 12-15 |
| Sephadex G-100 | 40-120 | 10.0 | 15-20 |
| Sephadex G-150 | 40-120 | 15.0 | 20-30 |
| Sephadex G-200 | 40-120 | 40.0 | 30-40 |

Treatment of Sephadex G-25 or G-50 types with chemical stability, are essentially those of the crossboxymethyl ether having 0.5–2.0 carboxymethyl groups per anhydroglucopyranosic unit. These carboxymethyl substituted cross-linked dextran gels are produced commercially for ion exchange use under the trade name of CM-Sephadex by Pharmacia Fine Chemicals, Inc., Uppsala, Sweden, and their properties are set forth in Table II below:

TABLE II

| Type | Fractionation range (m.w.) | Character of exchanger | Capacity (meq./g.) | Bed volume (ml./g.) |
|---|---|---|---|---|
| CM-Sephadex C-25. | Up to 10,000. | Weakly acidic cationexchanger. | 4-5 | 6-10 |
| CM-Sephadex C-50. | Over 10,000 | do | 4-5 | 20-40 |

The physical properties of these derivatives, and their chemical stabiilty, are essentially those of the crosslinked dextran gel starting materials.

The preparation and properties of these carboxymethyl subsituted cross-linked dextran gels are described in the following references:

U.S. Pat. No. 3,002,823 to Flodin et al. (1961).
Mikeš & Chalmers, Chromatographic Methods, D. Van Nostrand Company Ltd. (1961).
Porath, Advances in Protein Chemistry, vol. 17, Academic Press, pages 209–226 (1962).
Joustra Potides of the Biological Fluids, vol. 14, Elsevier Publishing Co., pages 533–541 (1966).
Determann, Gel Chromatography, Springer-Verlag New York Inc. (1968).

which are hereby incorporated by reference.

The bed of the gel grains is preferably arranged in the form of a column. The apparatus may suitably consist of a cylindrical tube supported at its lower portion by a porous disc or plate serving as support for the gel bed and provided at its upper portion with supply arrangements for a solution of the complex and for the elution liquid. The gel particles should be packed in the column as tightly as possible and in such a quantity that they take up the greatest part of the total packing volume, while the remainder of the packing volume is the so-called void volume, i.e., the total volume of the spaces between the gel grains. This packing may be attained in the following manner. The calculated quantity of gel of narrow grain size distribution is allowed to swell in water until equilibrium has been reached, and it is then stirred to form a uniform suspension. This suspension is poured into the tube which has already been partly filled with water. During the packing procedure the water is allowed to flow out of the column with uniform speed. During this procedure it can be observed that the packed bed grows from the bottom upwards with a sharp upper level above which the gel grains are in constant movements by convection. When the bed is packed, care should be taken that the upper level of the bed is as even as possible.

Following the bed packing procedure, the water remaining in the tube above the bed is allowed to flow down through the bed until the upper level of the water is about to disappear below the top of the bed. The downward flow of water is then interrupted and the aqueous solution of complex is carefully poured as a layer on top of the bed, whereupon the flow through the bed as again started (from this time on the liquid flowing out of the column is referred to as the "effluent") until the liquid level above the bed is about to disappear in the bed. The capacity of the carboxymethyl substituted cross-linked dextran gels to absorb the antibiotic AV290 is from about 0.1 gram to about 1.0 g. of AV290 per gram of dry gel.

Thereafter the elution liquid, pH 1.4–2.5 aqueous sulfuric acid, is poured as a layer on top of the bed and the flow through the bed again permitted to begin. The antibiotic AV290 then appears in the effluent after appropriate exchange and is collected in one or more fractions. Preferably, a gradient system of from weaker acid elution liquid to stronger acid elution liquid within the pH range is employed. The carboxymethyl substituted cross-linked dextran gels may be used in either the hydrogen form or the sodium form but the hydrogen form is preferred. These are prepared by suspending the gel beads in water for full regain, acidifying the suspension to pH 2.0 with any convenient mineral acid, washing with water and then packing the beads in the column.

It is important that the rate of flow of the solution through the bed of gel grains should not be too high. It has been found that, depending on the conditions, the linear rate of flow may be as high as 10 cm./min., but it is preferably not higher than 7 cm./min.

The pH of the effluent consisting of antibiotic AV290 dissolved in elution liquid is then adjusted to about 6.0 with barium hydroxide whereupon barium sulfate precipitates. The barium sulfate is removed by any convenient means such as filtration or centrifugation. At this point the clarified effluent may optionally be further clarified by treatment with granular carbon. The clarified effluent is then evaporated to dryness, preferably under high vacuum, at freezing temperature to provide highly purified antibiotic AV290.

For a clearer understanding of the invention, specific examples of it are set forth below. These examples are merely illustrative, and are not to be understood as limiting the scope and underlying principles of the invention an any way.

EXAMPLE 1

Preparation of antibiotic AV290-Tru-Tan RT Regular® complex

Fourteen liters of *S. candidus* fermentation broth containing 722 mcg. of antibiotic AV290 per ml. was adjusted to pH 1.8 with sulfuric acid and then filtered with the aid of diatomaceous earth. A 100 ml. portion of equal parts of Tru-Tan RT Regular® and water was added with stirring to 10 liters of the filtrate. The precipitate was allowed to settle and the supernatant was decanted. The precipitate was collected by centrifugation, washed twice with 250 ml. of water, suspended in about 1 liter of water and freeze dried. The dried product, 30.5 gms., assayed 28.3% antibiotic activity.

EXAMPLE 2

Preparation of antibiotic AV290-Tru-Tan RT Regular® complex

Three liters of filtered *S. candidus* fermentation broth containing 2000 mcg. of antibiotic AV290 per ml. was adjusted to pH 1.9 with sulfuric acid. Fifteen ml. of Tru-Tan RT Regular® was added to the stirred acidified filtrate. The mixture was centrifuged and the solids washed twice with 200 ml. of water by slurrying, centrifuging and decanting. The antibiotic activity that remained in the filtrate supernatant was precipitated with an additional 13.6 ml. of Tru-Tan RT Regular®. The washed solids from both steps were pooled, suspended in 500 ml. of water and freeze dried. The dried product, 4 gms., bioassayed 37.5% antibiotic activity.

Toxicity Study: The product was tested for toxicity as follows: The AV290-syntan complex was administered to Carworth Farms CF–1 female mice weighing 18–20 grams. The complex was orally administered in 0.2% agar at a dose level of 1024 milligrams per kilogram of body weight. All of the mice survived the 14-day test period.

EXAMPLE 3

Purification of antibiotic AV290 from antibiotic AV290-Tru-Tan RT Regular® complex by chromatography A 680 mg. portion of the dried product obtained in Example 1 was dissolved in 680 ml. of water at pH 8.6 by adjustment with sodium hydroxide. This mixture was added to a glass column containing 3.5 gm. of CM-Sephadex C-25 (H+ form). The column bed was washed with water and with pH 2.5 aqueous sulfuric acid. The antibiotic activity was located in the eluate by U.V. absorption at 280 nm. The portion of eluate containing AV290 was adjusted to pH 6.0 with barium hydroxide. The barium sulfate was removed by centrifugation and clear supernatant was freeze dried. The product, 89.9 mg., bioassayed 86% of AV290 opposed to pure reference standard.

EXAMPLE 4

Purification of antibiotic AV290 from antibiotic AV290-Tru-Tan RT Regular® complex by chromatography A 2223 ml. alkaline (pH 8.5) solution of AV290-Tru-Tan RT Regular® complex assaying about 4.3 grams of pure antibiotic was added to a column containing 6.2 gm. of CM-Sephadex C-25 (H+ form). The column bed was washed with water and with pH 2.5 aqueous sulfuric acid. The AV290 activity was eluted with pH 1.5 aqueous sulfuric acid and was located in the eluate by U.V. absorption at 280 nm. The portion of the eluate containing the AV290 activity was adjusted to about pH 6.0 with barium hydroxide. The barium sulfate was removed by centrifugation and the clear supernatant was freeze dried. The final product, 1.35 gms., was equivalent to pure AV290 reference standard by bioassay.

We claim:
1. A process of recovering highly purified antibiotic AV290 from a fermentation whole harvest mash containing it which comprises the steps of:
(a) producing a fermentation liquor by filtering the whole harvest mash;
(b) acidifying the fermentation liquor to a pH of from 1.4 to 5.0 with a pharmacologically acceptable acid;

(c) adding to the acidified liquor a syntan complexing agent comprising a mixture of compounds of the formula:

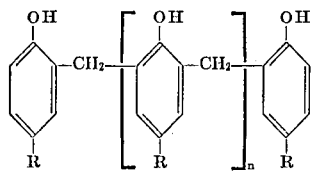

wherein R is hydrogen or methylene sulfonic acid and $n$ is 0, 1, 2, 3, or 4 with the proviso that about half of the R's present are methylene sulfonic acid, until a sufficient amount of the antibiotic AV290-syntan complex is imparted to said medium;

(d) removing the precipitated antibiotic AV290-syntan complex;

(e) preparing an aqueous solution of the complex having a pH of from 6.0 to 9.0 and having from about 100 mg. of antibiotic AV290 per ml. of solution;

(f) feeding the aqueous solution of complex to a bed of carboxymethyl substituted cross-linked dextran gel grains having (i) a content of carboxymethyl groups of from 0.5 to 2.0 per anhydroglucopyranosic unit and (ii) an average diameter in the dry state within the range of from about 0.05 mm. to about 0.5 mm., and being a copolymerization product obtained from dextran having average molecular weights within the range of from about 5,000 to about 100,000 and epichlorohydrin, immersed in an aqueous medium, the said aqueous solution of complex being supplied to the bed in a volume corresponding to from about 0.1 gram to about 1.0 gram of antibiotic AV290 per gram of dry gel;

(g) thereafter feeding pH 1.4–2.5 aqueous sulfuric acid eluant to the bed;

(h) collecting a fraction of the eluate containing antibiotic AV290;

(i) adjusting the pH of the eluate fraction to 6.0 with barium hydroxide;

(j) removing the precipitated barium sulfate; and (k) lyophilizing the resulting clarified eluate fraction;

steps (a) through (j) being carried out at a temperature of from about 15° C. to about 30° C.

References Cited

UNITED STATES PATENTS 3,338,786  8/1967  Kunstmann et al. ____ 424—118

JEROME D. GOLDBERG, Primary Examiner